(12) United States Patent
Alrabady et al.

(10) Patent No.: US 9,800,413 B2
(45) Date of Patent: Oct. 24, 2017

(54) SYSTEM AND METHOD FOR PERFORMING AN ASYMMETRIC KEY EXCHANGE BETWEEN A VEHICLE AND A REMOTE DEVICE

(75) Inventors: Ansaf I. Alrabady, Livonia, MI (US); Thomas M. P. Catsburg, Rochester, MI (US)

(73) Assignee: GM GLOBAL TECHNOLOGY OPERATIONS, INC., Detroit, MI (US)

( * ) Notice: Subject to any disclaimer, the term of this patent is extended or adjusted under 35 U.S.C. 154(b) by 1209 days.

(21) Appl. No.: 12/192,870

(22) Filed: Aug. 15, 2008

(65) Prior Publication Data
US 2010/0040234 A1 Feb. 18, 2010

(51) Int. Cl.
*H04L 9/32* (2006.01)

(52) U.S. Cl.
CPC .......... *H04L 9/321* (2013.01); *H04L 9/3247* (2013.01); *H04L 9/3263* (2013.01); *H04L 2209/84* (2013.01)

(58) Field of Classification Search
CPC ..... H04L 9/321; H04L 9/3247; H04L 9/3263; H04L 2209/84
USPC ......... 340/5.65; 455/420; 713/150, 156, 175
See application file for complete search history.

(56) References Cited

U.S. PATENT DOCUMENTS

| | | | |
|---|---|---|---|
| 6,442,690 B1 * | 8/2002 | Howard et al. | 713/175 |
| 6,839,710 B2 * | 1/2005 | Dabbish et al. | 701/35 |
| 6,865,681 B2 * | 3/2005 | Nuutinen | 726/14 |
| 7,010,682 B2 * | 3/2006 | Reinold et al. | 713/155 |
| 7,069,252 B2 * | 6/2006 | Ishimi et al. | 705/76 |
| 7,076,665 B2 * | 7/2006 | Reinold et al. | 713/189 |
| 7,127,611 B2 * | 10/2006 | Dabbish et al. | 713/168 |
| 7,131,005 B2 * | 10/2006 | Levenson et al. | 713/170 |
| 7,137,001 B2 * | 11/2006 | Dabbish et al. | 713/168 |
| 7,137,142 B2 * | 11/2006 | Puhl et al. | 726/10 |
| 7,181,615 B2 * | 2/2007 | Fehr | B60R 16/0234 713/156 |
| 7,207,041 B2 * | 4/2007 | Elson et al. | 718/104 |
| 7,228,420 B2 * | 6/2007 | Dabbish et al. | 713/170 |
| 7,325,135 B2 * | 1/2008 | Fehr et al. | 713/170 |
| 7,346,771 B2 * | 3/2008 | Narayanan | 713/153 |

(Continued)

FOREIGN PATENT DOCUMENTS

JP 2008-060789 A 3/2008
WO 01/82035 A2 11/2001

OTHER PUBLICATIONS

Maxim Raya et al. (Securing vehicular ad hoc networks, available online from Dec. 18, 2006).*

(Continued)

*Primary Examiner* — Oleg Korsak
(74) *Attorney, Agent, or Firm* — Lorenz & Kopf, LLP (57) ABSTRACT

Methods and apparatus are provided for performing an asymmetric key exchange between a vehicle and a first remote device. The method comprises storing predetermined cryptographic information on the vehicle, generating a first public key and a first private key that correspond to the vehicle, storing the first private key on the vehicle, and providing the first public key and descriptive data associated with the vehicle to a trusted entity, wherein the trusted entity is configured to store the first public key and the descriptive data in a location that is accessible to the first remote device.

4 Claims, 4 Drawing Sheets

(56) References Cited

U.S. PATENT DOCUMENTS

| | | | |
|---|---|---|---|
| 7,366,892 B2 * | 4/2008 | Spaur et al. | 713/151 |
| 7,401,229 B2 * | 7/2008 | Ishidoshiro | 713/189 |
| 7,472,001 B2 * | 12/2008 | Grace et al. | 701/36 |
| 7,548,744 B2 * | 6/2009 | Oesterling et al. | 455/411 |
| 7,549,046 B2 * | 6/2009 | Fehr et al. | 713/168 |
| 7,600,114 B2 * | 10/2009 | Reinold et al. | 713/156 |
| 7,649,997 B2 * | 1/2010 | Alrabady | 380/270 |
| 7,650,513 B2 * | 1/2010 | Grace et al. | 713/193 |
| 7,657,226 B2 * | 2/2010 | Gisler | 455/41.2 |
| 7,734,050 B2 * | 6/2010 | Tengler et al. | 380/270 |
| 7,742,603 B2 * | 6/2010 | Tengler et al. | 380/270 |
| 2002/0042879 A1 * | 4/2002 | Gould et al. | 713/176 |
| 2002/0053022 A1 * | 5/2002 | Groves et al. | 713/155 |
| 2003/0147534 A1 * | 8/2003 | Ablay et al. | 380/270 |
| 2003/0196080 A1 * | 10/2003 | Karman | 713/150 |
| 2004/0003228 A1 * | 1/2004 | Fehr et al. | 713/155 |
| 2004/0176071 A1 * | 9/2004 | Gehrmann et al. | 455/411 |
| 2004/0185842 A1 * | 9/2004 | Spaur et al. | 455/420 |
| 2005/0136892 A1 * | 6/2005 | Oesterling et al. | 455/411 |
| 2005/0262146 A1 * | 11/2005 | Grace et al. | 707/104.1 |
| 2006/0003737 A1 * | 1/2006 | Alrabady | 455/410 |
| 2006/0157563 A1 * | 7/2006 | Marshall | 235/382 |
| 2006/0255910 A1 * | 11/2006 | Fukushima et al. | 340/5.65 |
| 2007/0179903 A1 * | 8/2007 | Seinfeld et al. | 705/67 |
| 2007/0222555 A1 * | 9/2007 | Tengler et al. | 340/5.6 |
| 2007/0223702 A1 * | 9/2007 | Tengler et al. | 380/270 |
| 2007/0250700 A1 * | 10/2007 | Sidhu et al. | 713/150 |
| 2008/0027602 A1 * | 1/2008 | Yeap et al. | 701/29 |
| 2008/0150683 A1 * | 6/2008 | Mikan et al. | 340/5.31 |
| 2008/0232595 A1 * | 9/2008 | Pietrowicz et al. | 380/277 |
| 2008/0235138 A1 * | 9/2008 | Yokota et al. | 705/52 |
| 2008/0235509 A1 * | 9/2008 | Laberteaux et al. | 713/156 |
| 2009/0235071 A1 * | 9/2009 | Bellur et al. | 713/158 |
| 2009/0249074 A1 * | 10/2009 | Madhavan et al. | 713/176 |
| 2009/0259841 A1 * | 10/2009 | Laberteaux et al. | 713/156 |
| 2009/0291637 A1 * | 11/2009 | Alrabady et al. | 455/41.2 |
| 2009/0323967 A1 * | 12/2009 | Peirce et al. | 380/278 |
| 2009/0328189 A1 * | 12/2009 | Budyta et al. | 726/14 |
| 2010/0031025 A1 * | 2/2010 | Zhang et al. | 713/156 |
| 2010/0040234 A1 * | 2/2010 | Alrabady et al. | 380/278 |

OTHER PUBLICATIONS

English Translation of German Office Action for German Application No. 10 2009 037 193.1-31 dated Dec. 23, 2010.

German Office Action for German Application No. 10 2009 037 193.1-31 dated Dec. 23, 2010.

Menezes, A.; Van Oorschot, P.; Vanstone, S.: "Handbook of Applied Cryptography", CRC Press, 1997, pp. 543-590.

Wex, P., et al. "Trust Issues for Vehicular Ad Hoc Networks," In: IEEE Vehicular Technology Conference, May 11-14, 2008 pp. 2088-2804.

* cited by examiner

SYSTEM AND METHOD FOR PERFORMING AN ASYMMETRIC KEY EXCHANGE BETWEEN A VEHICLE AND A REMOTE DEVICE

TECHNICAL FIELD

The present invention generally relates to vehicle communication systems, and more particularly relates to a system and method for performing an asymmetric key exchange between a vehicle and a remote device.

BACKGROUND OF THE INVENTION

Increasingly, vehicles are being configured with vehicular communications systems (VCSs) for communicating with one or more remote devices. For example, a VCS may communicate with an Internet server, or other network server, belonging to the manufacturer of the vehicle, the dealership for the vehicle, or a third party. The VCS and the remote device may communicate regarding a variety of issues, including the current position of the vehicle, the current operational state of the vehicle, and/or input that is provided by the user of the vehicle.

Many VCSs are configured to use a secure communication protocols that include the use of encryption to establish a secure connection between the VCS and the remote device. A variety of cryptographic schemes are used to establish these secure connections. In one example, the VCS and the remote device encrypt the messages that they send to one another using a symmetric encryption technique that is based on a shared secret.

While the use of a shared secret and a symmetric encryption technique is an effective way of establishing a secure connection between a VCS and a remote device, managing and protecting these shared secrets in a large scale environment is not practical. For example, messages that are encrypted with a shared secret and transmitted between the VCS and a remote device may be compromised if an unauthorized third party discovers the shared secret. The unauthorized third party can then use the shared secret to decrypt these messages or to encrypt its own messages and transmit them to the VCS as though it were a valid remote device.

Accordingly, it is desirable to provide a secure system for exchanging cryptographic information between a vehicle and a remote device. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A vehicular communication apparatus is provided for performing an asymmetric key exchange with a first remote device. The vehicle communication system is coupled to a vehicle and comprises a wireless transceiver that is coupled to the vehicular communication apparatus and a processor that is coupled to the vehicular communication apparatus and the wireless transceiver. The processor is configured to store predetermined cryptographic information, to generate a first public key and a first private key, to store the first private key, and to provide the first public key and descriptive data that uniquely identifiers the vehicular communication apparatus to a trusted entity, wherein the trusted entity is configured to store the first public key and the descriptive data in a location where they can be accessed by the first remote device.

In other embodiments, a method is provided for performing an asymmetric key exchange between a vehicle and a first remote device. The method comprises storing predetermined cryptographic information on the vehicle, generating a first public key and first private key on the vehicle, storing the first private key on the vehicle, and providing the first public key and descriptive data associated with the vehicle to a trusted entity, wherein the trusted entity is configured to store the first public key and the descriptive data in a location that is accessible to the first remote device.

DESCRIPTION OF THE DRAWINGS

The present invention will hereinafter be described in conjunction with the following drawing figures, wherein like numerals denote like elements, and FIG. 1. depicts an exemplary vehicle configured for use with embodiments of the present invention.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-5 are merely illustrative and, particularly with respect to FIG. 1, may not be drawn to scale.

Figure 1:
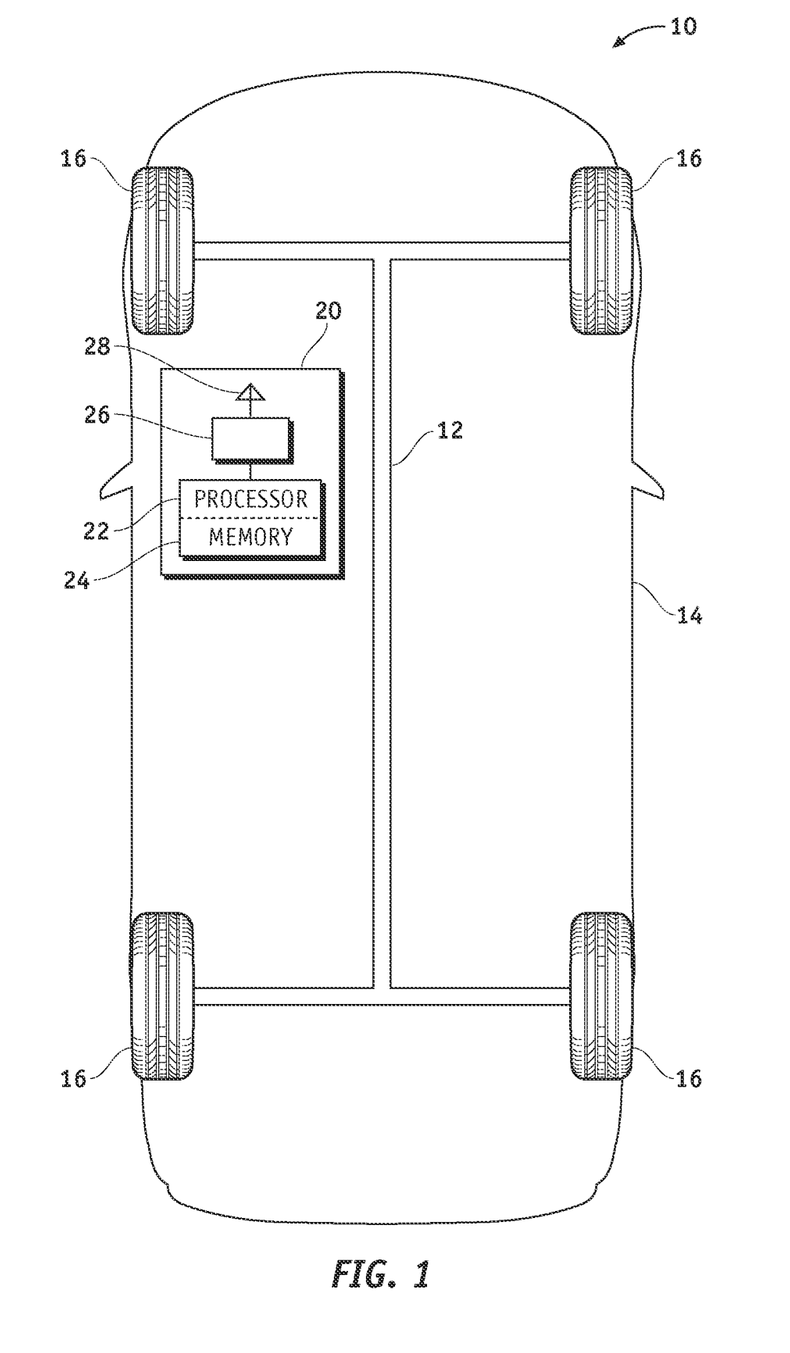

FIG. 1 is a depiction of an exemplary vehicle 10 configured for use with one embodiment of the present invention. The vehicle 10 includes a chassis 12, a body 14, four wheels 16 and a vehicle communication system (VCS) 20. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the illustrated embodiment, the VCS 20 includes a processor 22, memory 24, and a wireless transceiver 26. As further described below, the processor 22 generates and stores cryptographic keys, performs asymmetric key exchanges with at least one remote device, and establishes a secure connection with the at least one remote device. The processor 22 can be a programmable logic control system (PLC), a microprocessor, or any other type of electronic controller. It may include one or more components of a digital and/or analog type and may be programmable by software and/or firmware. The memory 24 is electronic memory (e.g., ROM, RAM, or another form of electronic memory) and stores instructions and/or data in any format, including source or object code.

The wireless transceiver 26 is coupled to a wireless antenna 28 and enables wireless communications between the VCS 20 and an electronic network via a wireless network access point. For example, in one embodiment the wireless transceiver 26 includes a short range wireless communication device that communicates with a wireless router or other short range network communication device. Further, the wireless transceiver 26 may include a cellular modem that is coupled to a cellular phone. In this case, the cellular phone connects the wireless modem to an Internet Service Provided (ISP) modem or other telephonic network access point. It should be noted that in other embodiments, other wireless communication technologies (including satellite) may also be used.

Figure 2:
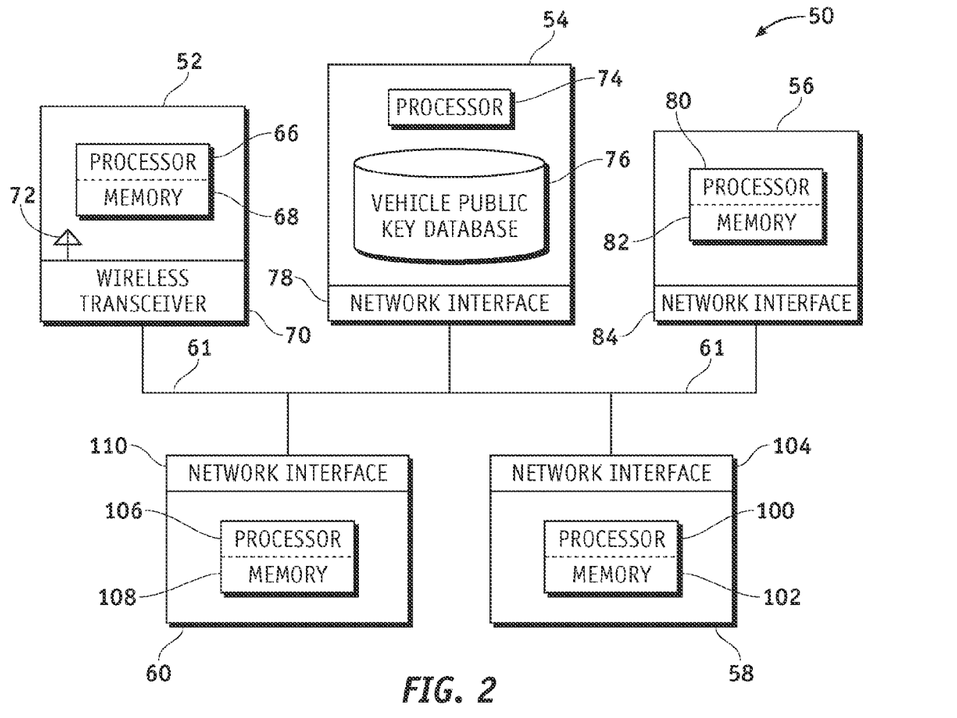
FIG. 2 is a block diagram of an exemplary system for performing an asymmetric key exchange between the vehicle of FIG. 1 and at least one remote device.

FIG. 2 is a block diagram of an exemplary system 50 for performing an asymmetric key exchange between a vehicle (e.g., the vehicle 10 of FIG. 1) and at least one remote device. The system 50 includes a VCS 52, a database server 54, a first remote device 56, a second remote device 58, and a certificate authority 60. Each of these devices is configured to communicate via an electronic network 61 or other communication medium as further described below.

The VCS 52 is coupled to a vehicle (e.g., the vehicle 10 of FIG. 1) and establishes a secure connection with at least one remote device (e.g., the first remote device 56 or the second remote device 58). As described above, the VCS 52 includes a processor 66, memory 68, a wireless transceiver 70, and an antenna 72.

The database server 54 is maintained and controlled by the manufacturer of the vehicle, or by another trusted entity, and includes a processor 74, a database 76, and a network interface 78. The database 76 associates the public keys for a plurality of vehicle communication systems, such as the VCS 52, with corresponding descriptive data. The descriptive data includes any information that uniquely identifies the vehicle communication system. For example, in one embodiment of the database 76, the public keys are associated with a vehicular identification number (VIN) that corresponds to the vehicle and a serial telematic identification number (STID) that corresponds to the vehicle communication system itself. The processor 74 may be a microprocessor or another suitable processing unit. It stores the public keys and associated descriptive data in the database 76 and retrieves the appropriate key from the database 76 based on its associated descriptive data. For example, given a particular VIN/STID pair the processor 74 queries the database 76 and retrieves the public key that corresponds to both VIN and STID. The network interface 78 enables the database server 54 to communicate with the appropriate devices, such as the first remote device 56, on the electronic network 61 as further described below.

The first remote device 56 may be any electronic device that is able to establish a secure connection with the VCS 52. For example, the first remote device 56 may be an Internet server of other network server that is controlled by a trusted entity, such as the manufacturer of the vehicle or the dealership and communicates with the VCS 52 to retrieve diagnostic or user created information for the vehicle or to provide instructions regarding the operation of the vehicle. The first remote device 56 is able to access the database server 54 to obtain the public key that corresponds to the VCS 52. In some embodiments the first remote server 56 maintains a cached copy of the database 76 that it updates periodically, while in other embodiments the first remote device 56 communicates with the database server 54 each time it needs a public key from the database 76. The first remote device 56 includes a processor 80, memory 82, and a network interface 84. The processor 80 may be a microprocessor or another suitable processing unit. It stores cryptographic information in memory 82 and obtains the public key that corresponds to descriptive data for the VCS 52 from the database (either its own cached copy or by communicating with the database server 54). The memory 82 is electronic memory (e.g., ROM, RAM, or another type of electronic memory) and stores instructions and/or data for the processor 80. The network interface 84 enables the first remote device 56 to communicate with the other devices, such as the VCS 52 and the database server 54, via the electronic network 61 as further described below.

The second remote device 58 may also be any device that is able to establish a secure connection with the VCS 52. However, in contrast with the first remote device 56, the second remote device 58 does not have access to the database 76 and the public key for the VCS 52. For example, the second remote device 58 may be a laptop computer that is used at a repair facility and needs to establish a secure connection with the VCS 52 to obtain diagnostic information from the vehicle but is unable to access the database 76. The second remote device 58 includes a processor 100, memory 102, and a network interface 104. The processor 100 may be a microprocessor or another suitable processing unit. It stores cryptographic information in memory 102 and communicates with the VCS 52. The memory 102 is electronic memory (e.g., ROM, REM, or another suitable form of memory) and stores instructions and/or data for the processor 100. The network interface 104 enables the second remote device 58 to communicate with other devices, such as the VCS 52, over the electronic network 61 as further described below.

Finally, the certificate authority 60 is maintained by a trusted third party and is configured to issue a root certificate and one or more public key certificates. These certificates are used by the VCS 52, the first remote device 56, and the second remote device 58 to authenticate one another. The certificate authority includes a processor 106, memory 108, and a network interface 110. The processor 106 may be a microprocessor or another suitable processing unit and is configured to generate the root certificates and the public key certificates. The memory 108 is electronic memory (e.g., ROM, RAM, or another suitable type of memory) and stores instructions and data for the processor 106. The network interface 94 enables the certificate authority 60 to communicate with other device, such as the VCS 52, via the electronic network 61 as described below.

Three separate embodiments of asymmetric key exchanges between the VCS 52 and the first remote device 56, or the second remote device 58, are presented below. In each of these embodiments, a public key for the VCS 52 is transmitted to a location where it can be accessed by either first remote device 56 or the second remote device 58. In addition, public keys for the first remote device 56 and/or the second remote device 58 are stored on the VCS 52. As further described below, these asymmetric key exchanges are performed in a manner that prevents unauthorized third parties from establishing a secure connection with the VCS 52 or the first remote device 56.

Figure 3:
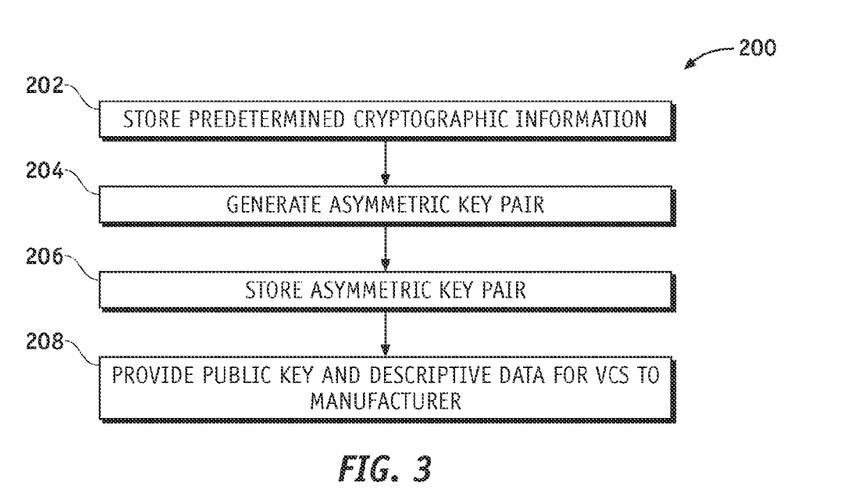
FIG. 3 is a flowchart of an exemplary method for performing an asymmetric key exchange according to a first embodiment of the present invention.

FIG. 3 is a flowchart of a method 200 for performing an asymmetric key exchange according to a first embodiment of the present invention is depicted. With reference to FIGS. 2 and 3, the first embodiment of the present invention utilizes the VCS 52 and the first remote device 56. As more fully described below, the public key for the first remote device 56 is stored in memory 68 on the VCS 52 and the public key and descriptive data for the VCS 52 are collected by the manufacturer, or by another trusted entity, and stored in the database 76 during the production process of the vehicle or at another time when the vehicle is under the control of the manufacturer, or a trusted entity. Thus, the asymmetric key exchange occurs in an environment that is controlled by the manufacturer, or other trusted entity, and no unauthorized cryptographic information is stored on the VCS 52 or in the database 76.

The steps of method 200 are performed by the processor 66 for the VCS 52. Certain of the steps described herein in conjunction with FIG. 3 may be performed in different orders than the illustrated and described order, and/or some steps may be performed in parallel with each other.

During step 202, the processor 66 stores predetermined cryptographic information in memory 68 on the VCS 52. In the first embodiment the predetermined cryptographic information includes a public key that corresponds to a private key that is stored on the first remote device 56. The public/private key pair for the first remote device 56 may be generated by the first remote device 56 itself, or by a separate electronic device using any conventional technique for generating asymmetric key pairs.

In some embodiments, the VCS 52 may establish secure connections with more than one remote device. In this case, the processor 66 associates the public key for a particular remote device with a unique identifier that is also known by the remote device. This enables the processor 66 to locate the public key for a given remote device based on the unique identifier.

The processor 66 stores the public keys and unique identifiers for the remote devices in memory 68 before the VCS 52 is installed on the vehicle or at some other time during the production process of the vehicle. This enables the manufacturer of the vehicle, or another trusted entity, to control which the information that is stored in memory 68 on the VCS 52. Thus, the manufacturer, or trusted entity, is able to ensure that only public keys corresponding to valid remote devices are stored on the VCS 52.

Next, during step 204 the processor 66 generates an asymmetric key pair for the VCS 52. The processor 66 may generated the asymmetric key pair using any conventional method for generating asymmetric key pairs after the VCS 52 is installed in the vehicle and powered on or at another time during the production process of the vehicle. The processor 66 then stores the asymmetric key pair that it generated during step 204 in memory 68 on the VCS 52 (step 206).

Finally, during step 208 the processor 66 provides the public key and descriptive data for the VCS 52 to the manufacturer or another trusted entity so that they can be stored in the database 76 on the database server 54. For example, the processor 66 may transmit the public key for the VCS 52 and the appropriate VIN and STID to one or more devices that are utilized by the manufacturer to collect such information during the production process of the vehicle. The manufacturer or trusted associates the public key for the VCS 52 with the VIN and STID in the database 76 on the database server 54.

Thus, the manufacturer, or trusted entity, controls the information that is stored in the database 76 during this first embodiment of the present invention. This prevents an unauthorized third party from storing its information in the database 76.

To establish a secure connection with the VCS 52, the first remote device 56 transmits its unique identifier and a signed message to the VCS 52. For example, the processor 80 for the first remote device 56 may utilize a conventional asymmetric encryption technique to sign a message using the private key for the first remote device 56. The processor 80 then transmits the signed message and its unique identifier to the VCS 52.

The processor 66 for the VCS 52 uses the unique identifier to locate the appropriate public key from its memory 68. The processor 66 then verifies the message using the asymmetric encryption technique and the public key.

Similarly, the VCS 52 may establish a secure connection with the first remote device 56 by transmitting a signed message and the descriptive data for the VCS 52 to the first remote device 56. For example, the processor 66 may sign a message using the private key for the VCS 52 and the asymmetric encryption technique. Processor 66 then transmits the signed message and the descriptive data (e.g., the VIN and STID) for the VCS 52 to the first remote device 56.

The processor 80 for the first remote device 56 retrieves the public key that corresponds to the descriptive data from the database 76 (e.g., either from a cached copy of the database 76 or by communicating with the database server). The processor 80 for the first remote device 56 uses the public key to verify the authenticity of the message.

An unauthorized third party is not able to establish a secure connection with either the VCS 52 or the first remote device 56. If an unauthorized third party sends a signed message and an identifier to the VCS 52, the identifier would most likely not correspond to a public key that is stored on the VCS 52. Further, even if the identifier did correspond to a public key (e.g., if the unauthorized third party knows the identifier for the first remote device 56) the unauthorized third party does not have access to the private key for the first remote device 56. Therefore, the public key that corresponds to the identifier for the first remote device 56 could not be used to verify the message.

In a similar manner, an unauthorized third party may send a signed message and descriptive data to the first remote device 56. However, the first remote device 56 will be unable to verify the signed message because the descriptive data most likely will not correspond to a public key that is stored in the database. Further, even if the descriptive data does correspond to a public key that is stored in the database 76 (e.g., if the unauthorized party knows the VIN and the STID for the VCS 52) the unauthorized party does not have access to the private key for the VCS 52. Therefore, the public key that corresponds to the descriptive data for the VCS 52 in the database 76 could not be used to verify the message.

Figure 4:
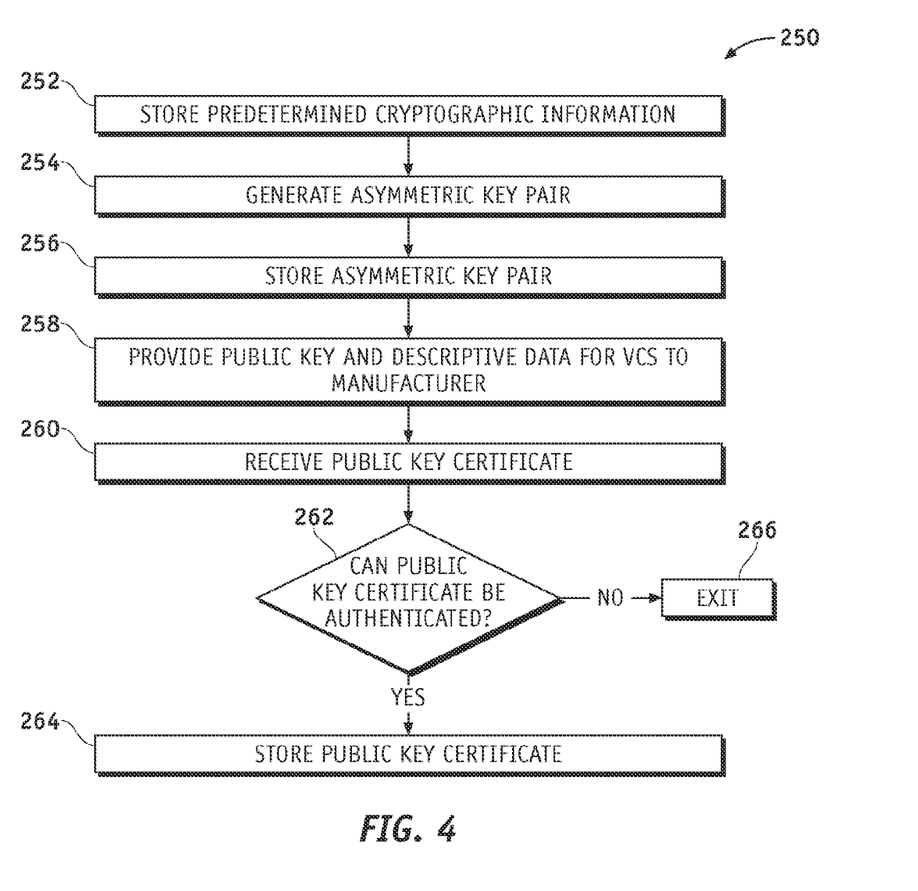
FIG. 4 is a flowchart of an exemplary method for performing an asymmetric key exchange according to a second embodiment of the present invention.

Turning now to FIG. 4 a flowchart for performing an asymmetric key exchange according to a second embodiment of the present invention is depicted. With reference to FIGS. 2 and 4 the second embodiment of the present invention utilizes the VCS 52, the database server 54, the first remote device 56, and the certificate authority 60. The use of the certificate authority 60 provides a secure mechanism for exchanging cryptographic content between the VCS 52 and the first remote device 56 even when they are not under the direct control of the manufacturer, or a trusted entity. The certificate authority generates a root certificate that is stored on the VCS 52 and can be used to authenticate other certificates that are generated by the certificate authority. Further, the VCS 52 will trust any entity that has a valid certificate that was issued by the certificate authority 60 because the certificate authority 60 will only issue certificates to authorized parties.

As described below, the certificate authority 60 issues a public key certificate to the first remote device 56 and that public key certificate is transmitted to the VCS 52. The VCS 52 uses the root certificate to authenticate the public key certificate, enabling the VCS 52 to verify that the first remote device 56 is an authorized party. The certificate authority 60 may issue the public key certificate at any time, even after the vehicle has left the production facility and the dealership. Therefore, this second embodiment does not require that the identity of the first remote device 56 be known during the production of the vehicle.

The steps of method 250 are performed by the processor 66 for the VCS 52. It is to be understood that certain of the steps described herein in conjunction with FIG. 4 may be performed in different orders than the illustrated and described order, and/or some steps may be performed in parallel with each other.

Method 250 begins during step 252 when the processor 66 stores predetermined cryptographic information in memory 68 on the VCS 52. In this second embodiment, the predetermined cryptographic information includes a root certificate for the certificate authority 60. This root certificate includes a public key that corresponds to a private key that is stored in memory 108 on the certificate authority 60. The processor 66 stores the root certificate in memory 68 before the VCS 52 is installed in the vehicle or at some other time during the production process when the manufacturer or another trusted entity is in direct control of the VCS 52.

Next, the processor 66 generates an asymmetric key pair for the VCS 52 (step 254) and stores this asymmetric key pair in memory (step 256). In addition, the public key for the VCS 52 that was generated during step 254 along with the descriptive data (e.g., VIN and STID) for the VCS 52 are provided to the manufacturer or another trusted entity (step 258) during the production of the vehicle or at another time when the vehicle is under the control of the manufacturer or a trusted entity. The manufacturer or trusted entity stores this information in the database 76 on the database server 54. Steps 254, 256 and 258 of method 250 may be performed in the same manner as steps 204, 206, and 208 of method 200 described above with regard to FIG. 3.

The processor 66 for the VCS 52 receives a public key certificate for the first remote device 56 during step 260. The public key certificate is generated by the processor 100 of the certificate authority 60 and includes a public key for the first remote device 56, a digital signature of the public key for the first remote device 56 generated using the private key for the certificate authority 60, and may also include a unique identifier for the first remote device 56. In addition, the public key certificate may include other information, such as an expiration date for the public key for the first remote device 56 or directions to validate a previously issued public key for the first remote device 56 against a list of revoked credentials. The public key certificate may be transmitted to the VCS 52 by the first remote device 56 or by the certificate authority 60.

Next, the processor 66 for the VCS 52 attempts to authenticate the public key certificate for the first remote device 56 (step 262). During step 262 the processor 66 uses the public key for the certificate authority 60 and a digital signature verifying technique to verify that the digital signature of the public key for the first remote device 56 (e.g., from the public key certificate) was generated by the certificate authority 60 and corresponds to the public key for the first remote device 56. If processor 66 is able to verify the digital signature of the public key for first remote device 56, then the public key certificate is authenticated and the processor 66 stores the public key certificate in memory 68 and performs any additional operations that may be required (e.g., revoking previously issued public keys) during step 264. Conversely, if processor 66 is not able to verify the digital signature of the public key for the first remote device 56, then the public key certificate is not authenticated and method 250 terminates (step 266).

To establish a secure connection with the VCS 52, the first remote device 56 transmits an signed message that is signed with its private key and its unique identifier to the VCS 52. For example, the processor 80 for the first remote device may sign a message with its private key and an asymmetric encryption technique and transmits the signed message and the unique identifier for the first remote device 56 the VCS 52.

The processor 66 for the VCS 52 retrieves the public key certificate for the first remote device 56 based on the unique identifier and extracts the public key. The processor 66 then verifies the signed message using the public key from the public key certificate. Further, the VCS 52 may establish a secure connection with the first remote device 56 using the techniques described above with respect to the first embodiment.

An unauthorized third party is not able to establish a secure connection with either the VCS 52 or the first remote device 56. If an unauthorized third party sends a signed message and an identifier to the VCS 52, the identifier would most likely not correspond to a public key certificate that is stored on the VCS 52. Further, even if the identifier did correspond to a public key certificate (e.g., if the unauthorized third party knows the identifier for a public key certificate) the unauthorized third party does not have access to the private key for the first remote device because that private key is secured on the first remote device 56. Therefore, the public key from the public key certificate for the first remote device 56 could not be used to verify the message. Further, an authorized third party is unable to establish a secure connection with the first remote device 56 for the same reasons described above with respect to method 200.

Additionally, even if the unauthorized third party learns the private key for a first remote device 56 in this second embodiment, the potential damage may be contained because the certificate authority 60 can issue a new public key certificate to the first remote device 56 that revokes or replaces the existing public key for the first remote device 56. The First remote device 56 may then transmit this new certificate to the VCS 52, and the VCS will authenticate it using steps 262, 264, and/or 266 as described above.

Figure 5:
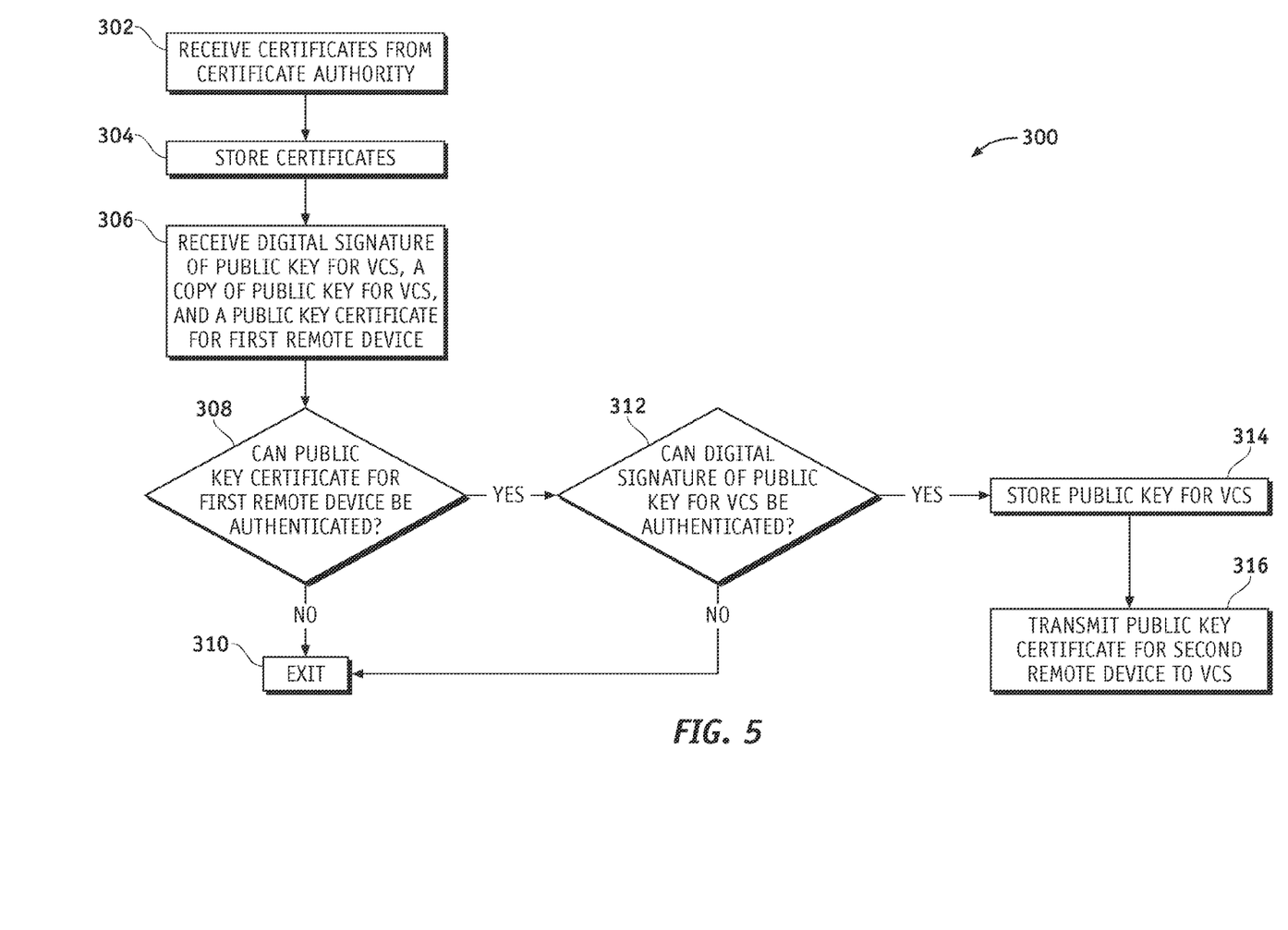
FIG. 5 is a flowchart of an exemplary method for performing an asymmetric key exchange according to a third embodiment of the present invention.

Turning now to FIG. 5, a flowchart of an exemplary method 300 for performing an asymmetric key exchange according to a third embodiment of the present invention is depicted. With reference to FIGS. 2 and 5, this second embodiment of the present invention utilizes the VCS 52, the database server 54, the first remote device 56, the second remote device 58, and the certificate authority 60.

As described previously, the second remote device 58 does not have access to the database 76 on the database server 54. Therefore, the second remote device 58 is not able to authenticate the VCS 52 using the methods described above (e.g., by retrieving a public key from the database 76 that corresponds to descriptive data provided by the VCS 52). Thus, during this method 300, the second remote device 58 authenticates the identity of the VCS 52 by establishing a chain of trust between the certificate authority 60, the first remote device 56, and the VCS 52. As more fully described below, the second remote device 58 verifies that the first remote device 56 is a trusted entity (e.g., because it has a public key certificate that was signed by trusted certificate authority 60). The second remote device 58 then verifies that the VCS 52 is a trusted entity by verifying that it has a signed copy of its public key that was generated by the trusted first remote device 56.

Prior to the commencement of method 300, the VCS 52 and the first remote device 56 must complete an asymmetric key exchange according to method 250 (FIG. 4). Further, the VCS 52 must request a digital signature of its pubic key from the first remote device 56. For example, the processor 66 for the VCS 52 may sign the request using an asymmetric encryption technique and the private key for the VCS 52. The processor 66 then transmits the signed request and the descriptive data for the VCS 52 to the first remote device 56. The processor 80 for the first remote device 56 retrieves the public key for the VCS 52 from the database 76 based on the descriptive data as described above and verifies the request. Processor 80 then generates a digital signature of the public key for the VCS 52 using the private key for the first remote device 56.

In one embodiment, processor 80 signs the digital signature of the public key for the VCS 52 and transmits the signed digital signature and the unique identifier for the first remote device 56 to the VCS 52. The processor 66 of the VCS 52 retrieves the public key for the first remote device 56 from memory 68 based on the unique identifier and verifies the signed digital signature. In an alternative embodiment, the processor 80 generates a digital certificate that includes the digital signature of the public key for the VCS 52 and the public key for the VCS 52. In this case, the processor 80 signs the digital certificate with the public key for the first remote device 56 and transmits the signed digital certificate the unique identifier to the VCS 52. The processor 66 for the VCS 52 retrieves the public key for the first remote device 56 from memory 68 based on the unique identifier and verifies the signed digital certificate.

The steps of method 300 are preformed by the processor 100 for the second remote device 58. It is to be understood that certain of the steps described herein in conjunction with FIG. 5 may be performed in different orders than the illustrated and described order, and/or some steps may be performed in parallel with each other.

Method 300 begins during step 302 when the processor 100 receives a root certificate and a public key certificate for the second remote device 58 from the certificate authority 60. The processor 100 stores these certificates in memory 102 (step 304).

Next, the processor 100 for the second remote device 58 receives the digital signature of the public key for the VCS 52 (e.g., which is generated with the private key of the first remote device 56 as described above), a copy of the public key for the VCS 52, and the public key certificate for the first remote device 56 (step 306). In addition, in some embodiments the processor also receives a unique identifier for the VCS 52 during step 306. This information is transmitted to the second remote device 58 by the VCS 52. It should be noted that in some embodiments, the digital signature of the public key for the VCS 52 and the public key for the VCS 52 may be in the form of the digital certificate that was generated by the first remote device 56 as described above.

Next, during step 308 the processor 100 attempts to authenticate the public key certificate for the first remote device 56. The processor 100 uses the public key for the certificate authority 60 (e.g., from the root certificate) and a digital signature verifying technique to verify that the digital signature of the public key for the first remote device 56 (e.g., from the public key certificate) was generated by the certificate authority 60 and corresponds to the public key for the first remote device 56 from the public key certificate. If processor 100 is not able to verify the digital signature of the public key for the first remote device 56, then the public key certificate is not authenticated and method 300 terminates (step 310). Conversely, if processor 100 is able to verify the digital signature of the public key for first remote device 56, then the public key certificate is authenticated and the processor 100 proceeds to step 312.

During step 312, the processor 100 attempts to authenticate the public key for the VCS 52 that it received during step 306. The processor 100 uses the public key for first remote device 56 (e.g., from the public key certificate for the first remote device 56 that was authenticated during step 308) and a digital signature verifying technique to verify that the digital signature of the public key for the VCS 52 was generated by the trusted first remote device 56 and corresponds to the public key for the VCS 52. If processor 100 is not able to verify the digital signature, then the public key of the VCS 52 is not authenticated and method 300 terminates (step 310). Conversely, if processor 100 is able to verify the digital signature, then it stores the digital signature and the unique identifier for the VCS 52 that were received during step 306 (step 314).

Finally, during step 316 the processor 100 transmits the public key certificate and a unique identifier for the second remote device 58 to the VCS 52. The VCS 52 authenticates the second remote device 58 using the same procedure that was described with regard to authenticating the first remote device 56 during step 262 of method 250.

To establish a secure connection with the VCS 52, the second remote device 58 transmits a message that is signed with its private key and its unique identifier to the VCS 52. For example, the processor 100 signs a message using the private key for the second remote device 58 and an asymmetric encryption technique. The processor 100 then transmits the signed message and the unique identifier for the second remote device 58 to the VCS 52.

The processor 66 for the VCS 52 retrieves the public key certificate that corresponds to the unique identifier for the second remote device 58. The processor 66 uses the public key from that public key certificate to verify the signed message.

Similarly, the VCS 52 may establish a secure connection with the second remote device 58 by signing a message with its private key and transmitting the encrypted message to the second remote device 58. The processor 100 for the second remote device 58 extracts the public key that corresponds to the VCS 52 and uses the public key to verify the message.

As described above, this technique prevents an unauthorized third party from establishing a secure connection with the VCS 52 or the second remote device 58. For example, if an unauthorized third party sends a signed message to the second remote device 58 the second remote device 58 will not be able to verify it (e.g., because it will not have a public key that corresponds to the key used by the unauthorized third party). Further, if the unauthorized third party transmits a signed message to the VCS 52, the VCS 52 will also be unable to verify it because it will not have the corresponding public key. Therefore, both the VCS 52 and the second remote device are able to identify messages transmitted by an unauthorized third party and discard them.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising:
    electronically receiving a first digital certificate from a certificate authority by a second remote device, the first digital certificate comprising a first public key that corresponds to a first private key that is stored on the certificate authority;
    storing the first public key and the first private key in a same memory device in a vehicle; and
    electronically receiving a second public key, a digital signature of the second public key, and a second digital certificate from the vehicle, wherein:
    the second public key corresponds to a second private key stored on the same memory device in the vehicle;
    the digital signature of the second public key is generated by a first remote device, different from the second remote device and different from the certificate authority, using a third private key; and
    the second digital certificate being previously generated by the certificate authority and includes a third public key and a digital signature of the third public key, wherein the third public key corresponds to the third private key and the digital signature of the third public key is generated by the certificate authority using the first private key.

2. The method of claim 1, further comprising:
    authenticating the second digital certificate using the first public key from the first digital certificate; and
    authenticating the digital signature of the second public key using the third public key from the second digital certificate, when the second digital certificate is authenticated.

3. The method of claim 2 further comprising:
    storing the second public key when the digital signature of the second public key is authenticated.

4. The method of claim 3, further comprising:
    transmitting a third digital certificate comprising a fourth public key and a digital signature of the fourth public key to the vehicle, wherein the fourth public key corresponds to a fourth private key and the digital signature of the fourth public key is generated by the certificate authority using the first private key.

* * * * *